Aug. 28, 1962 B. MYERS ETAL 3,050,888

CHANGEABLE EXHIBITORS

Filed Dec. 26, 1958 2 Sheets-Sheet 1

BERNARD MYERS INVENTORS.
and JOSEPH DEMBINSKY
BY
Albert M. Parker
ATTORNEY.

Aug. 28, 1962 B. MYERS ETAL 3,050,888

CHANGEABLE EXHIBITORS

Filed Dec. 26, 1958 2 Sheets-Sheet 2

BERNARD MYERS INVENTORS.
and JOSEPH DEMBINSKY
BY
Albert M. Parker
ATTORNEY.

United States Patent Office 3,050,888
Patented Aug. 28, 1962

3,050,888

CHANGEABLE EXHIBITORS

Bernard Myers, Surbiton, and Joseph Dembinsky, Hendon Way, London, England, assignors to John Myers, New York, N.Y.

Filed Dec. 26, 1958, Ser. No. 783,056
8 Claims. (Cl. 40—132)

This invention relates to changeable exhibitors, or signs, and is particularly concerned with such devices incorporating features which serve, in most startling manner, to attract attention, alternating with features which portray the message to be conveyed.

Schemes for attracting people's attention, so that a message may be imparted to them, are legion in the sign art and a goodly number of them rely on light intensity, or colors, or animated figures, for creating that attention.

In most such instances, however, and even in the case of large outdoor advertising signs, too little attention has been paid to the proper harmony of colors to gain and hold the attention of the viewers. It is the appreciation of this, resulting in the harnessing of the effectiveness of color and the utilization of it in simple, concentrated manner which, taken alternatively with the message to be delivered, form the basis of this invention.

In addition to the right color harmony to have the most effective appeal, the invention also contemplates the combining of the same with music, appropriately written or selected, to fit the mood that is created by the color presentation.

To be more specific, the invention contemplates the high intensity propagation of a light beam resulting from the reflection of light from a plurality of color discs in juxtaposed relation and rotating at high speeds. It has been found, in accordance with the invention, that if such discs have the surfaces thereof formed throughout into equal alternating segments of the primary colors, red, blue and green, and if the discs are all rotated at the same high speed, a flood of constantly changing color will result which will have an impelling attractiveness for the passerby. This attractiveness, whether or not coupled with suitable music, can then be used in sudden alternating relationship with message means supplanting it to put the message across to the observer in a most striking manner.

Generally speaking the invention contemplates the achieving of its end by the positioning of the color discs and light sources of adequate intensity on one side of a half silvered mirror, or similar semi-light transmissive, semi-light reflective element, while incorporating, in that element, the sign to be displayed. Then when other light sources of suitable intensity are provided on the opposite side of the half silvered mirror and means are provided for alternately cutting off the light behind the mirror projected on to the discs then turning on the light directed against the outer face of the mirror, the switch can be made back and forth from the appeal of the flood of color to the transmission of the message and vice versa.

It is accordingly an object of this invention to improve upon the attraction aspect of changeable exhibits or signs.

Another object is to do so in a simple, economical manner.

Another object is to do so by means of a simple readily portable mechanism, complete in itself, calling for no particular installation.

A further object is to provide for a flood of colored light of rapidly and continuously changing characteristics.

A further object is to provide a combination of such light with appropriate sound.

A still further object is to combine the showing of such colored light with the portrayal of the message to be imparted to the viewer in such a way that they follow each other in quick succession to give a startling and commemorative effect.

Further and more detailed objects of this invention will in part be obvious and in part be pointed out as the description of the invention, taken in conjunction with the accompanying drawing, proceeds.

Figure 2:
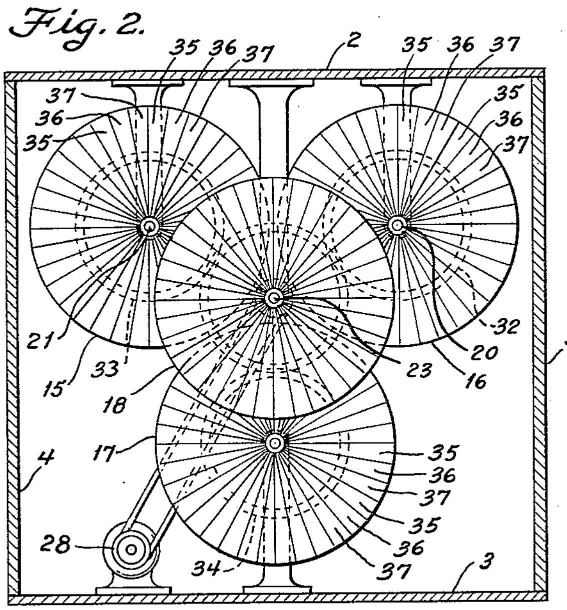
FIG. 2 is a vertical section of the housing of FIG. 1, taken on line 2—2 of FIG. 1, looking in the direction of the arrows.

In the accompanying drawing the invention is illustrated as being embodied in the display cabinet which accommodates all the apparatus of the invention. It is to be understood, however, that such showing is purely for illustrative purposes, since the invention can be embodied in cabinets of a wide variety of shapes and sizes and, in fact, can be made up in displays which need no cabinet or surrounding at all. Furthermore, though various mechanical expedients have been shown for the correlating and driving of the various elements of the invention, it is likewise to be understood that these are merely illustrative of simple means for the carrying out of the invention. Various other forms of drives and mountings, whether mechanical, electrical or fluid, can be employed in connection with the invention if desired.

Considering then the illustrated embodiment of the invention, the operating elements are shown as enclosed in a housing or cabinet, generally indicated at 1, having top and bottom walls 2 and 3 respectively, side walls 4 and 5 respectively, and a back wall 6, leaving the front 7, opposite the wall 6, open. Inside of the cabinet the rear part, towards the wall 6, accommodates the colored discs and drive mechanism therefor, generally indicated at 8, while spaced downwardly therefor are a plurality of light sources 9 and 10.

As here shown these lights are applied to the top and bottom walls of the cabinet but may alternately or additionally be applied to the side walls 4 and 5. Next, outwardly from this set of light sources, is the display screen or window 11, which preferably encloses or isolates the open front of the cabinet from the interior thereof. Finally the walls of the cabinet, outwardly of the screen 11, are employed for the mounting of additional light sources such as 12 and 13.

Reverting to the color reflecting discs and drive mechanism therefor, all as generally indicated at 8, there are preferably four such discs as shown at 15, 16, 17 and 18, so mounted in overlapping relationship, that there are the open spaces inwardly between the discs 15, 16 and 17 are not visible from the window side. The discs 15 to 18 are mounted on parallel shafts 20, 21, 22 and 23, each of which is suitably mounted with respect to the wall of the housing by brackets such as those shown at 24 and 25 for the shaft 20. Each bracket carries a suitable bearing member such as those shown at 26 and 27, which are preferably of ball-bearing or other frictionless type, inasmuch as the discs are intended to be driven at high speed and to operate for long times at a stretch. Similar brackets and bearings, as shown, are employed for the other shafts, but need not be detailed here.

Figure 1:
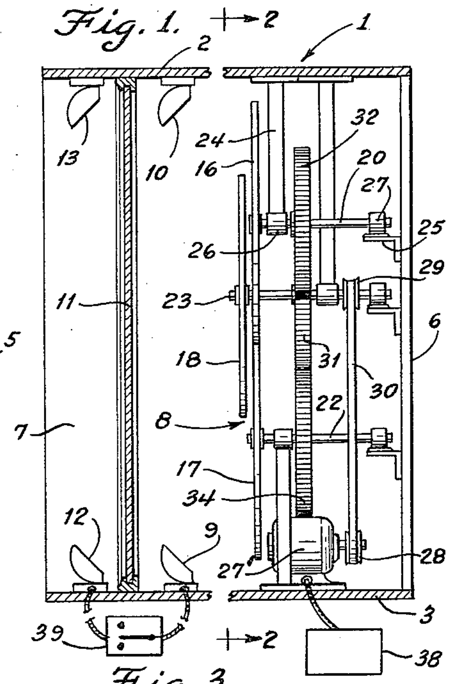
FIG. 1 is a side elevation of a housing containing display mechanism in accordance with the invention, with the side wall removed to show the elements of the invention contained therein.

In the form of FIGS. 1 and 2 the drive of the shafts is effected from the motor 27' mounted on the bottom 3 of the housing and driving the shaft 23 by means of pulleys 28 and 29 and a belt 30. The pulleys are, of course, secured respectively to the motor shaft and to the shaft 23 to rotate therewith. Drive from the shaft 23 to the shafts 20, 21 and 22 is here shown as effected by a series of gears, all of the same size, so that the discs will all be driven at the same speed. The drive gear 31 is secured to the shaft 23 and meshes with the gears 32, 33 and 34, keyed to the other shafts in order to drive those shafts. The gears 31 through 34 are preferably of light weight inexpensive construction to keep both the cost and weight of the assembly down as well as keeping down the inertiia factor in the driving mechanism.

The discs 15 through 18 are, of course, secured to their respective shafts to turn therewith and, like the gears, are of light weight construction, for they are intended to rotate at high speed. In this regard it is to be noted that the drive for the discs, here exemplified by the electric motor 27', should be a high speed device since, for best results, the discs should be rotated at high speeds. Variations in the speed, to give variations in the color effects, are also contemplated, particularly where the motor speed can be varied automatically. In the course of the operation it is contemplated that, for a certain period of time the motor will run at maximum speed and then, by an automatic control, will have its speed stepped down for time increments, which control will re-cycle itself as time goes on. Timing devices, to effect such variations in the operation, are well known and do not, in and of themselves, form any particular part of the invention, so it is not thought necessary to make any more than a token showing, the same as at 38.

To give the pronounced color effects desired by the invention, each of the discs is divided, throughout its surface, into segments of equal size. Each three adjoining segments make up a section, the segments of which are each respectively colored with one of the primary colors, i.e., red, blue and green. This pattern of sections repeats throughout all of the discs so that the same arrangement of colors prevails on the faces of all of the discs.

Considering that the discs are to be driven at high speed, the segments should not be so small that the differences between sets of them become indistinguishable. On the other hand a reasonably large number of segments per disc is desired to produce the full effects. As an illustration, where the segments 35, 36 and 37, colored respectively, red, blue and green, each take up 10° of the arch of the circle, each section would take up 30° of the total area. Thus twelve such sets would be applied to the disc and the same pattern arrangement would be followed throughout all of the discs.

To produce the desired display effect, strong illumination from light sources, such as 9 and 10 in FIG. 1, is directed on the faces of the discs. This light must be intense and its beam be directed or focused onto the faces of the discs. As already mentioned, the light can come from above and below the discs, but may additionally or alternatively come from positions at the sides of the housing. The end to be achieved is that of producing a veritable flood of varying colored light by reflection of that light from the faces of the discs, which flood of light fuses into and out of various color combinations to produce an intriguing fantasy of color.

Figures 5, 6, 7, 8, 9:
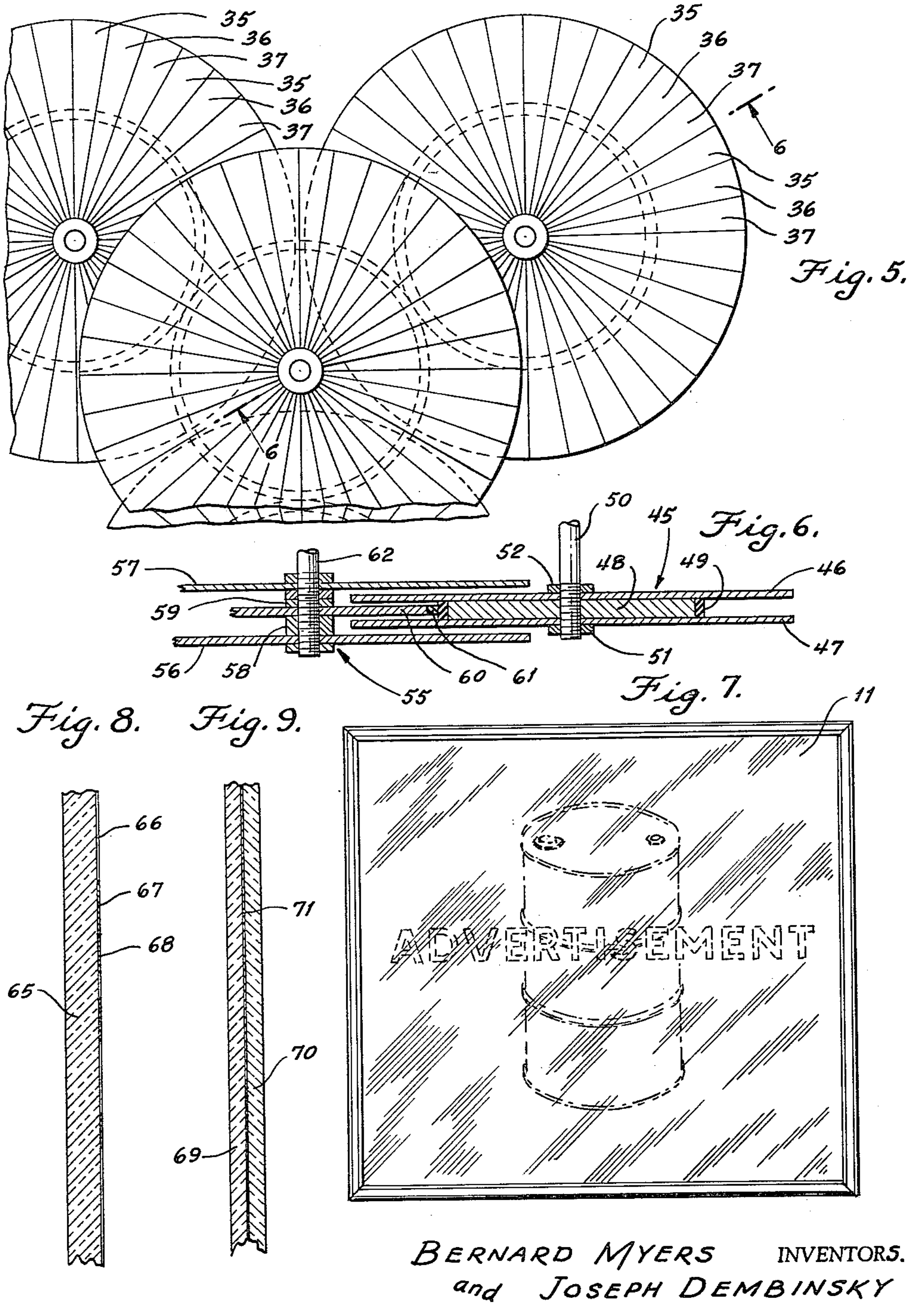
FIG. 5 is an enlarged fragmentary elevational view of a plurality of discs in accordance with a modified form of the invention, illustrating the driving of the same.
FIG. 6 is a sectional view taken on line 6—6 of FIG. 5 and looking in the direction of the arrows.
FIG. 7 is a front elevational view of a display screen in accordance with the invention.
FIGS. 8 and 9 are fragmentary sections of material for forming the display screen of FIG. 7, illustrating various manners for the make-up of the same.

While the lights, such as 9 and 10, are on and the reflector discs are rotating, the flood of color is projected toward the window 11 in the open end 7 of the housing. To pass out through the same it must first pass through a half silvered mirror, or similarly operable member 11. When the color display cycle has been run through however, it is time to switch and, for a short period at least, show some announcement or advertisement. This is done as seen in FIG. 7, by so forming the display and lettering in generally the same manner as is done for the half silvering, or comparable treatment, of the mirror, but with sufficient difference in application that though the intense colored light from behind will shine right through it, light directed solely on the outer face of the mirror will make the display stand out. Hence at the desired moment, by means of the switch 39, light from the sources 9 and 10 is cut off and simultaneously light from sources 12 and 13, at the outer side of the half silvered mirror, is turned on. This latter light will impinge upon and be reflected from the mirrored surface and advertising display carried by the member 11. The display will stand out sharply, particularly so since the flood of colored light will be suddenly extinguished so one will no longer be able to see through the member 11.

When the advertisement has been on display long enough to be perceived by the onlookers which, as modern advertising techniques show, does not need to be prolonged to have its effect felt, the procedure is reversed. The lights 12 and 13 are extinguished and, simultaneously, the lights 9 and 10 are turned on again. Preferably all of this is done automatically as part of a timed cycle, either forming part of, or in addition to, the timed cycle for varying the speed of the discs, if any, as hereintofore pointed out.

There is no necessity for stopping the rotation of the discs during the light change from color to advertisement and back again, for the discs cannot be seen in any event. Furthermore it is preferable to continue their rotation, since the consumption of electric power and wear and tear on the mechanism is decidedly less than would be involved in the starting and stopping of the rotation on each change.

Figure 4:
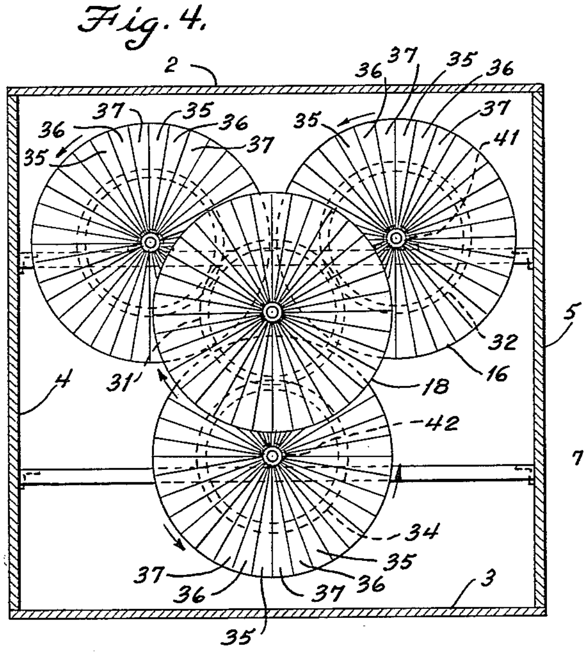
FIG. 4 is a vertical section thereof taken on line 4—4 of FIG. 3 and looking in the direction of the arrows.
Figure 3:
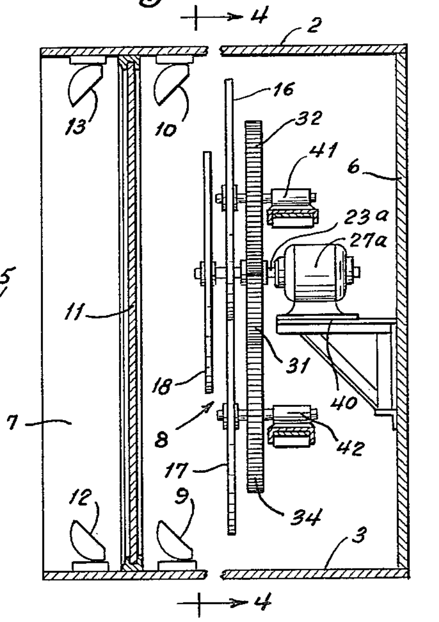
FIG. 3 is a view similar to FIG. 1 of a somewhat modified form of the invention.

A somewhat modified drive arrangement is illustrated in the form of FIGS. 3 and 4. Here a motor 27a is mounted on a bracket 40 against the back wall 6 of the housing in such a manner that the motor shaft 23a is, at one and the same time, the shaft on which the centre disc 18 is mounted. This merely eliminates the belt drive arrangement of the previous form, with the gear drive between the gears 31, 32, 33 and 34, being the same as in the previous form. Also the discs are the same and are positioned in the same manner so that the description of them, given in connection with the form of FIGS. 1 and 2, is equally applicable.

In this form, since the motor is strongly supported and assists on carrying the weight of the mechanism, single and smaller bearings, for the various shafts as seen at 41 and 42, are possible. In all other respects the construction and operation of this form is the same as that of FIGS. 1 and 2, so bears the same reference characters.

A somewhat different type of disc and drive for the same is shown in FIGS. 5 and 6. Here each disc is made double, with a spacer and driving member inbetween. Accordingly the disc assembly indicated at 45 has disc faces 46 and 47 with a separator member 48 of smaller diameter between them. This separator member is peripherally bordered by a driving rim 49. The disc assembly 45 is mounted on a shaft 50 and is held together by means such as the nuts 51 and 52 secured on the shaft.

The disc assembly 45 is characteristic of the three outside discs while the centre disc assembly, generally indicated at 55, is somewhat different. The latter again serves as the drive member for the set of discs, itself being suitably driven in one of the manners previously shown, or in other suitable manner. The disc assembly 55 again has disc elements 56 and 57 spaced apart, not only by spacer members 58 and 59, but, also, by the centre drive disc 60.

The drive disc 60, which has its periphery supplied with suitable friction driving rim 61, is formed to inter-fit between the disc elements 46 and 47 of the other three discs and to engage their driving rim 49 in order to drive the same. The disc assembly 55 is suitably assembled and secured on the shaft 62 by means of the securing members shown.

In the disc construction of FIGS. 5 and 6, assuming the provision of unobtrusive supports for the various shafts for the discs, the assembly of discs could be made visible from both sides simultaneously. In other respects the coloring of the discs, the operation, and the illumination of them would be the same as described for the previous forms, so need not be repeated here.

In FIGS. 7, 8 and 9 various forms of half silvered mirror or screen arrangements for the element 11 are illustrated. As shown in FIG. 7 this element, no matter how constructed, besides being one where visibility therethrough depends on the relative illumination on the opposite sides thereof, carries advertising indicia. This indicia is only visible when light behind the element is cut off and intense light is directed against the front surface thereof.

This indicia can be made to stand out in various ways. One of these is to apply the advertising with a different color or form of material from that forming the mirrored surface. Thus, in FIG. 8, a glass plate 65 is shown as having its inner surface 66 equipped with advertising indicia, or marking 67, along with the normally half-silvering material 68.

In the FIG. 9 showing laminated material, having two sheets 69 and 70, which may both be of plastic or one of plastic and the other of glass, are secured together with the half silvered and advertising indicia being incorporated in the layer 71 joining them.

Though no specific provision has been shown for the incorporation of musical accompaniment to the color, this, of course, can be achieved by employing one of a variety of the types of recording and reproducing systems commonly available. The operation of such system can be keyed to the operation of the discs and lights, through one unitary timing mechanism or by separate timing mechanisms as desired. Whether sound be added or not it has been found that this arrangement of rotating discs with intense light projected against them and, in turn, reflected out from them, produces an almost compelling urge to draw closer and see what is causing it. This establishes a highly effective medium for putting an advertising, or some other message, across to the viewers. In the absence of the advertising aspect, the display has such a pleasantly attractive appeal to it that it can be used alone as mere entertainment and is admirably suited for filling in such situations as where crowds are pouring into a theatre or other amusement place as a lead for the program to be put on.

Having described my invention what I claim as new and desire to secure by Letters Patent is:

1. A changeable exhibitor comprising means for producing a flood of colored light, means for displaying a semi-transparent message in the path of said colored light, said message being invisible while said light is passed therethrough, means for alternately rendering one or the other of said message and said flood of colored light visible to an observer, said alternate rendering means including a partially light transmissive and partially light reflective member, said message forming part of said partially light transmissive and partially light reflective member at the reflective face thereof, said colored light producing means including a plurality of light reflecting colored discs and means for projecting an intense beam of light thereon to be reflected therefrom, said colored discs being divided into primary colored segments in alternating arrangement, means for rotating said colored discs at high speed and all at the same speed, and for rotating one in a direction opposite to that of the others.

2. A changeable exhibitor which comprises a housing having an open face, a plurality of colored discs supported by and mounted in said housing for rotation on parallel axes, a motor mounted on said housing and means interposed between said motor and discs for driving said discs at the same speed, a part light transmissive part light reflective element including indicia differing optically from the remainder of said element carried by said housing and positioned in opposed relationship with respect to said discs, means to illuminate said discs from a position between said light transmissive element means and said discs and on the opposite side of said light transmissive element from said discs for illuminating the face of said light transmissive element remote from said discs to cause said indicia to be visible.

3. A changeable exhibitor as in claim 2, wherein said colored discs are each divided into the same number of segments of the same size and said segments are alternately colored about the surface of said disc with the three primary colors, the coloring of all discs being the same and there being a multiplicity of sets of said three primary colors on each disc.

4. A changeable exhibitor as in claim 2 and including means for alternately shutting off the illumination of said discs and turning on the illumination of said outer face of said partially light transmissive element remote from said discs.

5. A changeable exhibitor as in claim 2, wherein said shafts, carrying said discs, are all driven at the same speed by means of a gear drive.

6. A changeable exhibitor as in claim 2, wherein said discs are provided with shafts having driving elements secured thereto, said driving elements for all of said discs being of the same size and said driving elements for said discs being in frictional edge driving contact with said discs.

7. A changeable exhibitor comprising three colored discs lying in the same plane in triangular relationship and a fourth colored disc having its centre located at a point equal distance from the axes of said three discs, said discs being mounted on parallel operatively interconnected shafts and said discs having their exposed faces formed with segments of different colors thereon, said discs being divided into multiples of three of said segments and each set of three segments carrying the primary colors in the same order, said fourth disc overlying portions of said first three discs and filling the space between them and means to rotate all of said discs about their axis at high speed.

8. A changeable exhibitor as in claim 7, wherein said fourth disc rotates in a direction opposite to that of said three discs.

References Cited in the file of this patent

UNITED STATES PATENTS

| | | |
|---|---|---|
| 885,928 | Hunt | Apr. 28, 1908 |
| 1,182,266 | Gibson | May 9, 1916 |
| 1,684,534 | Campbell | Sept. 18, 1928 |
| 1,768,409 | Kuczorra | June 24, 1930 |
| 1,851,585 | Kliegl | Mar. 29, 1932 |
| 1,881,417 | Hodgkin | Oct. 4, 1932 |
| 2,000,153 | Watson | May 7, 1935 |
| 2,155,618 | Roberts | Apr. 25, 1939 |
| 2,299,362 | Villani | Oct. 20, 1942 |
| 2,360,536 | Avery | Oct. 17, 1944 |
| 2,527,803 | Fleak | Oct. 31, 1950 |
| 2,831,580 | Carbone | Apr. 22, 1958 |

FOREIGN PATENTS

| | | |
|---|---|---|
| 10,196 | Great Britain | Apr. 26, 1915 |
| 17,208 | Great Britain | May 19, 1910 |